(12) United States Patent
Akah et al.

(10) Patent No.: US 10,526,546 B2
(45) Date of Patent: Jan. 7, 2020

(54) SYSTEMS AND METHODS FOR CRACKING HYDROCARBON STREAMS UTILIZING CRACKING CATALYSTS

(71) Applicant: Saudi Arabian Oil Company, Dhahran (SA)

(72) Inventors: Aaron Chi Akah, Dhahran (SA); Anas Saleh Aqeeli, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/897,966

(22) Filed: Feb. 15, 2018

(65) Prior Publication Data

US 2018/0237703 A1 Aug. 23, 2018

Related U.S. Application Data

(60) Provisional application No. 62/462,691, filed on Feb. 23, 2017.

(51) Int. Cl.
| | |
|---|---|
| *C10G 11/05* | (2006.01) |
| *B01J 29/80* | (2006.01) |
| *C10G 11/18* | (2006.01) |
| *B01J 29/40* | (2006.01) |
| *B01J 29/70* | (2006.01) |

(52) U.S. Cl.
CPC .............. *C10G 11/05* (2013.01); *B01J 29/80* (2013.01); *C10G 11/18* (2013.01); *B01J 29/40* (2013.01); *B01J 29/7007* (2013.01); *B01J 2229/186* (2013.01); *B01J 2229/20* (2013.01); *B01J 2229/26* (2013.01); *B01J 2229/42* (2013.01); *C10G 2400/20* (2013.01)

(58) Field of Classification Search
CPC .... C10G 11/05; C10G 11/18; C10G 2400/20; B01J 29/08; B01J 29/084; B01J 29/40; B01J 29/80; B01J 29/7007; B01J 2029/062
See application file for complete search history.

(56) References Cited

U.S. PATENT DOCUMENTS

| | | |
|---|---|---|
| 3,074,878 A | 1/1963 | Pappas |
| 3,758,403 A | 9/1973 | Rosinski et al. |

(Continued)

FOREIGN PATENT DOCUMENTS

| | | |
|---|---|---|
| CN | 101 117 591 B | 1/2012 |
| CN | 103 785 453 A | 5/2014 |

(Continued)

OTHER PUBLICATIONS

Speight("Density, Specific Gravity, and API Gravity" Rules of Thumb for Petroleum Engineers (2017), p. 221-222 (Year: 2017).*

(Continued)

*Primary Examiner* — Brian A McCaig
*Assistant Examiner* — Jason Y Chong
(74) *Attorney, Agent, or Firm* — Dinsmore and Shohl, LLP

(57) ABSTRACT

According to one or more embodiments, a hydrocarbon feed stream may be cracked by a method comprising contacting the hydrocarbon feed stream with a cracking catalyst in a reactor unit. The hydrocarbon feed stream may have an API gravity of at least 40 degrees. The cracking catalyst may comprise one or more binder materials, one or more matrix materials, and *BEA framework type zeolite.

21 Claims, 3 Drawing Sheets

(56) References Cited

U.S. PATENT DOCUMENTS

| | | |
|---|---|---|
| 4,419,221 A | 12/1983 | Castagnos, Jr. et al. |
| 4,980,053 A | 12/1990 | Li et al. |
| 5,275,720 A | 1/1994 | Ward |
| 5,279,726 A | 1/1994 | Ward |
| 5,286,369 A | 2/1994 | Roberie et al. |
| 5,326,465 A | 7/1994 | Yongqing et al. |
| 5,350,501 A | 9/1994 | Ward |
| 5,358,918 A | 10/1994 | Yukang et al. |
| 5,457,078 A * | 10/1995 | Absil .................. B01J 29/7007 502/64 |
| 5,462,652 A | 10/1995 | Wegerer |
| 6,566,293 B1 | 5/2003 | Vogt et al. |
| 6,656,346 B2 | 12/2003 | Ino et al. |
| 7,084,087 B2 | 8/2006 | Shan et al. |
| 7,510,645 B2 | 3/2009 | Wang |
| 7,923,399 B2 * | 4/2011 | Long .................... B01J 29/405 502/73 |
| 8,845,882 B2 | 9/2014 | Shu et al. |
| 8,900,445 B2 * | 12/2014 | Xie ..................... B01J 29/7615 208/113 |
| 9,181,491 B2 | 11/2015 | Kibby et al. |
| 9,227,181 B2 | 1/2016 | Harris |
| 2008/0093263 A1 | 4/2008 | Cheng et al. |
| 2008/0293561 A1 | 11/2008 | Long et al. |
| 2009/0325786 A1 | 12/2009 | Liu et al. |
| 2012/0248008 A1 | 10/2012 | Dougherty et al. |
| 2013/0023710 A1 | 1/2013 | Ravichandran et al. |
| 2013/0066131 A1 | 3/2013 | Harris |
| 2014/0124410 A1 | 5/2014 | Rayo Mayoral et al. |
| 2016/0074846 A1 | 3/2016 | Domokos et al. |

FOREIGN PATENT DOCUMENTS

| | | |
|---|---|---|
| WO | 9502653 A1 | 1/1995 |
| WO | 2014042641 A1 | 3/2014 |

OTHER PUBLICATIONS

"Energy industry conversion" (https://www.platts.com/IM.Platts.Content/MethodologyReferences/ConversionTables/Images/CCSS1015_Energy_IIndustry_Conversions_LRG.pdf) (date:2017).*

"API Gravity" (https://www.engineeringtoolbox.com/api-gravity-d_1212.html, available on Oct. 6, 2017).*

Corma et al., "Zeolite Beta: Structure, Activity, and Selectivity for Catalytic Cracking", American Chemical Society (1988) pp. 49-63.

International Search Report and Written Opinion dated May 8, 2018, pertaining to PCT/US2018/018494, filed Feb. 16, 2018, 13 pages.

International Search Report and Written Opinion dated May 7, 2018, pertaining to PCT/US2018/018482, filed Feb. 16, 2018, 12 pages.

U.S. Office Action dated Oct. 4, 2018 pertaining to U.S. Appl. No. 15/897,915.

Office Action dated May 1, 2019 pertaining to U.S. Appl. No. 15/897,915, filed Feb. 15, 2018, 16 pgs.

* cited by examiner

SYSTEMS AND METHODS FOR CRACKING HYDROCARBON STREAMS UTILIZING CRACKING CATALYSTS

CROSS-REFERENCE TO RELATED APPLICATIONS

This application claims priority to U.S. Provisional Patent Application Ser. 62/462,691 filed Feb. 23, 2017, which is incorporated by reference herein in its entirety.

BACKGROUND

Field

The present disclosure relates to the cracking of hydrocarbons and, more particularly, to systems and method for the cracking of light hydrocarbon streams by zeolite-containing catalyst systems.

Technical Background

Light olefins such as ethylene, propylene, and butene are basic intermediates for a large portion of the petrochemical industry. They are mainly obtained through the thermal cracking (sometimes referred to as "steam pyrolysis" or "steam cracking") of petroleum gases and distillates such as naphtha, kerosene, or even gas oil. However, as demands rise for these basic intermediate compounds, other production sources must be considered beyond traditional thermal cracking processes utilizing petroleum gases and distillates as feedstocks.

These intermediate compounds may also be produced through refinery fluidized catalytic cracking (FCC) processes, where heavy feedstocks such as gas oils or residues are converted. For example, an important source for propylene production is refinery propylene from the cracking of distillate feedstocks such as gas oils or residues. However, these feedstocks are usually limited and result from several costly and energy intensive processing steps within a refinery.

BRIEF SUMMARY

Accordingly, in view of the ever growing demand of these intermediary petrochemical products such as butene, there is a need for processes and catalyst systems to produce these intermediate compounds from other types of feed materials, such as crude oils or portions of crude oil streams. The present disclosure is related to processes and cracking catalysts for producing these intermediate compounds, sometimes referred to in this disclosure as "system products," by the direct conversion of feedstock fuels such as extra light crude oil or a portion of extra light crude oil. For example, in some embodiments, a crude oil stream may be divided into two or more fractions and at least the light fraction (that is, the fraction with the greater average boiling point) may be processed by contact with the presently disclosed catalyst compositions. Conversion of light olefins from a light fraction of a crude oil feedstock, such as extra light crude oil, may be beneficial as compared with other feedstocks in producing these intermediate compounds because the feedstocks may be more widely available, may involve less processing costs, or both. However, new cracking catalysts are needed to selectively convert light hydrocarbons to light olefins.

According to one or more embodiments, a hydrocarbon feed stream may be cracked by a method comprising contacting the hydrocarbon feed stream with a cracking catalyst in a reactor unit. The hydrocarbon feed stream may have an API gravity of at least 40 degrees. The cracking catalyst may comprise one or more binder materials in an amount of from 5 weight percent (wt. %) to 35 wt. % of the total cracking catalyst, one or more matrix materials in an amount of from 25 wt. % to 65 wt. % of the total cracking catalyst, and *BEA framework type zeolite in an amount of from 5 wt. % to 45 wt. % of the total cracking catalyst, where at least 80 wt. % of the total zeolite in the cracking catalyst is *BEA framework type zeolite.

According to another embodiment, a system for cracking a hydrocarbon feed stream may comprise a reactor, a hydrocarbon feed stream entering the reactor, a product stream exiting the reactor, and a cracking catalyst positioned at least in the reactor. The hydrocarbon feed stream may have an API gravity of at least 40 degrees. The cracking catalyst may comprise one or more binder materials in an amount of from 5 wt. % to 35 wt. % of the total cracking catalyst, one or more matrix materials in an amount of from 25 wt. % to 65 wt. % of the total cracking catalyst, and *BEA framework type zeolite in an amount of from 5 wt. % to 45 wt. % of the total cracking catalyst, where at least 80 wt. % of the total zeolite in the cracking catalyst is *BEA framework type zeolite.

According to yet another embodiment, a hydrocarbon feed stream may be cracked by a method comprising contacting the hydrocarbon feed stream with a cracking catalyst in a reactor unit. The hydrocarbon feed stream may have an API gravity of at least 40 degrees. The cracking catalyst may comprise one or more binder materials in an amount of from 5 wt. % to 30 wt. % of the total cracking catalyst, one or more matrix materials in an amount of from 30 wt. % to 60 wt. % of the total cracking catalyst, *BEA framework type zeolite in an amount of from 5 wt. % to 45 wt. % of the total cracking catalyst, and MFI framework type zeolite in an amount of from 5 wt. % to 45 wt. % of the total cracking catalyst.

According to yet another embodiment, a system for cracking a hydrocarbon feed stream may comprise a reactor, a hydrocarbon feed stream entering the reactor, a product stream exiting the reactor, and a cracking catalyst positioned at least in the reactor. The hydrocarbon feed stream may have an API gravity of at least 40 degrees. The cracking catalyst may comprise one or more binder materials in an amount of from 5 wt. % to 30 wt. % of the total cracking catalyst, one or more matrix materials in an amount of from 30 wt. % to 60 wt. % of the total cracking catalyst, *BEA framework type zeolite in an amount of from 5 wt. % to 45 wt. % of the total cracking catalyst, and MFI framework type zeolite in an amount of from 5 wt. % to 45 wt. % of the total cracking catalyst.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
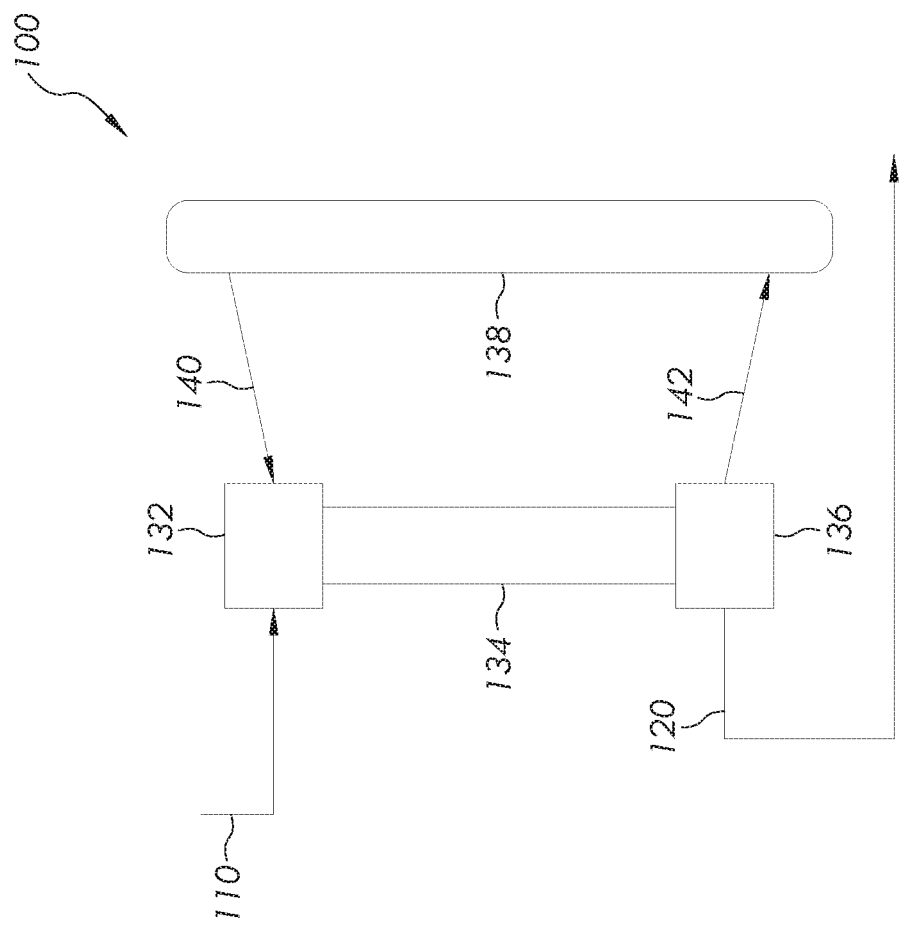
FIG. 1 depicts a generalized schematic diagram of an embodiment of a fluid catalytic cracking reactor unit, according to one or more embodiments described in this disclosure.

For the purpose of describing the simplified schematic illustrations and descriptions of FIG. 1, the numerous valves, temperature sensors, electronic controllers and the like that may be employed and well known to those of ordinary skill in the art of certain chemical processing operations are not included. Further, accompanying components that are often included in conventional chemical processing operations, such as refineries, such as, for example, air supplies, catalyst hoppers, and flue gas handling are not depicted. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Described in this disclosure are various embodiments of systems and methods for processing hydrocarbon feed streams, such as crude oils or fractions of crude oil streams, into petrochemical products such as streams that include one or more of ethylene, propylene, or butene. Generally, the processing of the hydrocarbon feed stream may include cracking of the hydrocarbon feed stream by contacting the hydrocarbon feed stream with a cracking catalyst. According to one or more embodiments, the hydrocarbon feed stream may comprise a relatively light crude oil, such as a light fraction of extra light crude oil. The cracking catalyst may include a *BEA framework type zeolite. According to additional embodiments, the cracking catalyst may include a zeolite mixture comprising a *BEA framework type zeolite (such as, but not limited to, zeolite Beta) and an MFI framework type zeolite (such as, but not limited to, ZSM-5). It should be understood that *BEA and MFI refer to zeolite framework types as identified by their respective three letter codes established by the International Union of Pure and Applied Chemistry (IUPAC). In addition to the zeolite, the cracking catalyst may comprise other materials, such as, without limitation, one or more matrix materials, one or more binder materials, or both. The cracking catalyst may convert the hydrocarbon feed stream into a product stream that may include, without limitation, one or more of dry gases (that is, one or more of hydrogen gas, methane, and ethane), liquefied petroleum gases (that is, one or more of propane and butane), light olefins (that is, one or more of ethylene, propylene, and butene), gasoline (that is, hydrocarbons having 4 to 12 carbons per molecule, including alkanes, cycloalkanes, and olefins), or coke. It should be understood that not all hydrocarbons of the feed stream are cracked by the cracking catalyst and, generally, mostly heavier components of the feed are cracked.

According to some embodiments described in the present disclosure, the hydrocarbon feed stream which is converted to the product stream by contact with the cracking catalyst may include, consist essentially of, or entirely consist of a fraction of a crude oil stream, such as a fraction of a relatively light crude oil such as Arab Extra Light Crude Oil or another crude oil with similar properties. For example, the hydrocarbon feed stream may have a relatively great American Petroleum Institute (API) gravity. For example, the API gravity of the hydrocarbon feed stream may be at least 30 degrees, at least 40 degrees, or even at least 50 degrees. For example, in one embodiment, the hydrocarbon feed stream comprises or consists of a light fraction of Arab Extra Light Crude where the maximum boiling point of any of the contents of the light fraction of the Arab Extra Light Crude is a temperature from 200° C. to 400° C. (such that the crude oil was fractionated at a temperature from 200° C. to 400° C.). As described in the present disclosure, "crude oil" refers to fuels which have been minimally processed or not processed following extraction from their respective sources. For example, crude oils may include hydrocarbon feedstocks which have been minimally processed such as by the partial or full removal of unwanted contaminants such as one or more of sulfur, heavy metals, nitrogen, or aromatics, such as by hydroprocessing. Additionally, it should be understood that while some embodiments presently described are related to the cracking of crude oil feedstocks, other embodiments may be directed to the cracking of fractions of crude oil feedstocks or partially refined hydrocarbon feedstocks.

Without being bound by theory, it is believed that the use of *BEA framework type zeolites, such as zeolite Beta, in the cracking catalyst promotes conversion of the hydrocarbon feed stream to a product stream having an enhanced yield of light olefins. For example, the utilization of zeolite Beta may promote the formation of propylene from the light constituents of a crude oil feedstock. For example, the utilization of zeolite Beta, alone or in combination with one or more other zeolites such as ZSM-5, may promote the formation of light olefins from the light portion of a crude oil feedstock. Further, without being bound by theory, it is believed zeolite Beta has a high propensity towards olefins because of low hydrogen transfer activity, where zeolite Beta may be more active than zeolite Y due to the stronger acidity of the hydroxyl groups associated with the framework aluminum present on the surface of zeolite Beta. Zeolite Beta may also be able to withstand severe catalytic cracking operating conditions in the presence of deposited metal contaminants, and may be more hydrothermally stable and tolerant to vanadium deposition than some other zeolites, such as zeolite Y. In some embodiments, another advantage of zeolite Beta as opposed to zeolite Y may be that zeolite Y has a limited silica-to-alumina ratio between 1.5 and 3.0, where as zeolite Beta may range from 5 to 100 or even in excess of 100. In additional embodiments, the use of zeolite Beta may improve octane number of produced gasoline and may supply greater alkylate yields.

Embodiments of the presently disclosed cracking catalysts may include *BEA framework type zeolite. In one embodiment, a relatively large amount of the zeolite present in the cracking catalyst is *BEA framework type zeolite. For example, at least 80 wt. % of the total zeolite in the cracking catalyst may be *BEA framework type zeolite, such as zeolite Beta, or at least 99 wt. % of the total zeolite may be *BEA framework type zeolite. In another embodiment, in addition to *BEA framework type zeolite, the cracking catalyst includes MFI framework type zeolite. In some embodiments, at least 99 wt. % of the total zeolite is one or more of *BEA framework type zeolite and MFI framework type zeolite, or the combination of both.

As used in this disclosure, a "cracking catalyst" refers to any substance which increases the rate of a cracking chemical reaction. As used in this disclosure, "cracking" generally refers to a chemical reaction where a molecule having carbon to carbon bonds is broken into more than one molecule by the breaking of one or more of the carbon to carbon bonds, or is converted from a compound which includes a cyclic moiety, such as an aromatic, to a compound which does not include a cyclic moiety or contains fewer cyclic moieties than prior to cracking. However, while cracking catalysts promote cracking of a reactant, the cracking catalyst is not limited to cracking functionality, and may, in some embodiments, be operable to promote other reactions.

As described in this disclosure, according to one or more embodiments, the cracking catalyst comprises one or more zeolite compositions. As used in this disclosure, a zeolite composition refers to a zeolite with a particular zeolitic framework structure and having a particular material composition. Thus, zeolite compositions may differ between one another by framework structure, composition, or both. Zeolite compositions may be grouped into "zeolite types" such as MFI framework type zeolites (such as ZSM-5 zeolite) or *BEA framework type zeolites (such as zeolite Beta), which are described subsequently in this disclosure. All of the zeolite types taken together constitute the "total zeolite." According to some embodiments, the total zeolite in the cracking catalyst may be from 10 wt. % to 50 wt. % of the cracking catalyst. For example, in embodiments, the total zeolite in the cracking catalyst may be from 10 wt. % to 15 wt. % of the cracking catalyst, from 10 wt. % to 20 wt. % of the cracking catalyst, from 10 wt. % to 25 wt. % of the cracking catalyst, from 10 wt. % to 30 wt. % of the cracking catalyst, from 10 wt. % to 35 wt. % of the cracking catalyst, from 10 wt. % to 40 wt. % of the cracking catalyst, from 10 wt. % to 45 wt. % of the cracking catalyst, from 15 wt. % to 50 wt. % of the cracking catalyst, from 20 wt. % to 50 wt. % of the cracking catalyst, from 25 wt. % to 50 wt. % of the cracking catalyst, from 30 wt. % to 50 wt. % of the cracking catalyst, from 35 wt. % to 50 wt. % of the cracking catalyst, from 40 wt. % to 50 wt. % of the cracking catalyst, or from 45 wt. % to 50 wt. % of the cracking catalyst.

In one or more embodiments, the catalyst composition may comprise one or more *BEA framework type zeolites, such as zeolite Beta. As used in this disclosure, "zeolite Beta" refers to zeolite having a *BEA framework type according to the IUPAC zeolite nomenclature and consisting of silica and alumina. The molar ratio of silica to alumina in the zeolite Beta may be at least 10, at least 25, or even at least 100. For example, the molar ratio of silica to alumina in the zeolite Beta may be from 5 to 500, such as from 25 to 300. Examples of commercially available zeolite Beta include CP814C, CP814E and CP811C-300 (produced by Zeolyst International). The zeolite Beta may be in the form of H-Beta. H-Beta refers to the acidic form of zeolite Beta usually derived from ammonium-Beta ($NH_4$-Beta) via calcination. In one or more embodiments, the zeolite Beta may be stabilized by direct reaction with phosphoric acid ($H_3PO_4$) or by impregnation with ammonium hydrogen phosphate (($NH_4$)$_2HPO_4$).

According to one or more embodiments, the *BEA framework type zeolite may comprise one or more phosphorous-containing compounds, such as a phosphorous oxide, such as phosphorous pentoxide ("$P_2O_5$"). For example, the *BEA framework type zeolite may include one or more phosphorous-containing compounds in an amount of from 1 wt. % to 20 wt. % of the total amount of *BEA framework type zeolite, such as from 5 wt. % to 10 wt. % of the total amount of *BEA framework type zeolite. According to additional embodiments, the amount of phosphorous-containing compounds as a portion of the total amount of *BEA framework type zeolite may be from 1 wt. % to 18 wt. % of the *BEA framework type zeolite, from 1 wt. % to 16 wt. % of the *BEA framework type zeolite, from 1 wt. % to 14 wt. % of the *BEA framework type zeolite, from 1 wt. % to 12 wt. % of the *BEA framework type zeolite, from 1 wt. % to 10 wt. % of the *BEA framework type zeolite, from 1 wt. % to 8 wt. % of the *BEA framework type zeolite, from 1 wt. % to 6 wt. % of the *BEA framework type zeolite, from 1 wt. % to 4 wt. % of the *BEA framework type zeolite, from 1 wt. % to 2 wt. % of the *BEA framework type zeolite, from 2 wt. % to 20 wt. % of the *BEA framework type zeolite, from 4 wt. % to 20 wt. % of the *BEA framework type zeolite, from 6 wt. % to 20 wt. % of the *BEA framework type zeolite, from 8 wt. % to 20 wt. % of the *BEA framework type zeolite, from 10 wt. % to 20 wt. % of the *BEA framework type zeolite, from 12 wt. % to 20 wt. % of the *BEA framework type zeolite, from 14 wt. % to 20 wt. % of the *BEA framework type zeolite, from 16 wt. % to 20 wt. % of the *BEA framework type zeolite, or from 18 wt. % to 20 wt. % of the *BEA framework type zeolite.

According to one or more embodiments, the cracking catalyst may comprise an amount of *BEA framework type zeolite in an amount of from 5 wt. % to 45 wt. % of the total cracking catalyst. For example, according to embodiments, the cracking catalyst may comprise *BEA framework type zeolite in an amount of from 5 wt. % to 40 wt. % of the total cracking catalyst, from 5 wt. % to 35 wt. % of the total cracking catalyst, from 5 wt. % to 30 wt. % of the total cracking catalyst, from 5 wt. % to 25 wt. % of the total cracking catalyst, from 5 wt. % to 20 wt. % of the total cracking catalyst, from 5 wt. % to 15 wt. % of the total cracking catalyst, from 5 wt. % to 10 wt. % of the total cracking catalyst, from 10 wt. % to 45 wt. % of the total cracking catalyst, from 15 wt. % to 45 wt. % of the total cracking catalyst, from 20 wt. % to 45 wt. % of the total cracking catalyst, from 25 wt. % to 45 wt. % of the total cracking catalyst, from 30 wt. % to 45 wt. % of the total cracking catalyst, from 35 wt. % to 45 wt. % of the total cracking catalyst, or from 40 wt. % to 45 wt. % of the total cracking catalyst. According to additional embodiments, the cracking catalyst may comprise *BEA framework type zeolite in an amount of from 5 wt. % to 35 wt. % of the total cracking catalyst, from 15 wt. % to 35 wt. % of the total cracking catalyst, from 20 wt. % to 35 wt. % of the total cracking catalyst, or from 30 wt. % to 35 wt. % of the total cracking catalyst.

In one or more embodiments, the catalyst composition may comprise one or more MFI framework type zeolites, such as ZSM-5. As used in this disclosure, "ZSM-5" refers to zeolites having an MFI framework type according to the IUPAC zeolite nomenclature and consisting of silica and alumina. ZSM-5 refers to "Zeolite Socony Mobil-5" and is a pentasil family zeolite that can be represented by the chemical formula $Na_nAl_nSi_{96-n}O_{192} \cdot 16H_2O$, where $0<n<27$. According to one or more embodiments, the molar ratio of silica to alumina in the ZSM-5 may be at least 20. For example, the molar ratio of silica to alumina in the zeolite Y may be at least 5, at least 12, or even at least 30, such as from 5 to 30, from 12 to 30, or from about 5 to 80. Examples of commercially available zeolite ZSM-5 include CBV2314, CBV3024E, CBV5524G and CBV28014 (available from Zeolyst International).

According to one or more embodiments, the MFI framework type zeolite may comprise one or more phosphorous-containing compounds, such as a phosphorous oxide, such as phosphorous pentoxide ("$P_2O_5$"). For example, the MFI framework type zeolite may include one or more phosphorous-containing compounds in an amount of from 1 wt. % to 20 wt. % of the total amount of MFI framework type zeolite, such as from 5 wt. % to 10 wt. % of the total amount of MFI framework type zeolite. According to additional embodiments, the amount of phosphorous-containing compounds as a portion of the total amount of MFI framework type zeolite may be from 1 wt. % to 18 wt. % of the MFI framework type zeolite, from 1 wt. % to 16 wt. % of the MFI framework type zeolite, from 1 wt. % to 14 wt. % of the MFI framework type zeolite, from 1 wt. % to 12 wt. % of the MFI framework type zeolite, from 1 wt. % to 10 wt. % of the MFI framework type zeolite, from 1 wt. % to 8 wt. % of the MFI framework type zeolite, from 1 wt. % to 6 wt. % of the MFI framework type zeolite, from 1 wt. % to 4 wt. % of the MFI framework type zeolite, from 1 wt. % to 2 wt. % of the MFI framework type zeolite, from 2 wt. % to 20 wt. % of the MFI framework type zeolite, from 4 wt. % to 20 wt. % of the MFI framework type zeolite, from 6 wt. % to 20 wt. % of the MFI framework type zeolite, from 8 wt. % to 20 wt. % of the MFI framework type zeolite, from 10 wt. % to 20 wt. % of the MFI framework type zeolite, from 12 wt. % to 20 wt. % of the MFI framework type zeolite, from 14 wt. % to 20 wt. % of the MFI framework type zeolite, from 16 wt. % to 20 wt. % of the MFI framework type zeolite, or from 18 wt. % to 20 wt. % of the MFI framework type zeolite.

According to one or more embodiments, the cracking catalyst may comprise an amount of MFI framework type zeolite in an amount of from 5 wt. % to 45 wt. % of the total cracking catalyst. For example, according to embodiments, the cracking catalyst may comprise MFI framework type zeolite in an amount of from 5 wt. % to 40 wt. % of the total cracking catalyst, from 5 wt. % to 35 wt. % of the total cracking catalyst, from 5 wt. % to 30 wt. % of the total cracking catalyst, from 5 wt. % to 25 wt. % of the total cracking catalyst, from 5 wt. % to 20 wt. % of the total cracking catalyst, from 5 wt. % to 15 wt. % of the total cracking catalyst, from 5 wt. % to 10 wt. % of the total cracking catalyst, from 10 wt. % to 45 wt. % of the total cracking catalyst, from 15 wt. % to 45 wt. % of the total cracking catalyst, from 20 wt. % to 45 wt. % of the total cracking catalyst, from 25 wt. % to 45 wt. % of the total cracking catalyst, from 30 wt. % to 45 wt. % of the total cracking catalyst, from 35 wt. % to 45 wt. % of the total cracking catalyst, or from 40 wt. % to 45 wt. % of the total cracking catalyst. According to additional embodiments, the cracking catalyst may comprise MFI framework type zeolite in an amount of from 10 wt. % to 30 wt. % of the total cracking catalyst, from 10 wt. % to 20 wt. % of the total cracking catalyst, from 5 wt. % to 10 wt. % of the total cracking catalyst, or from 10 wt. % to 15 wt. % of the total cracking catalyst.

According to one or more embodiments, one or more of the MFI framework type zeolite and *BEA framework type zeolite may be substantially free of transition metals. As used in this disclosure, a substance is "substantially free" of a compound if that substance includes less than or equal to 1 wt. % of that compound. For example, one or more of the MFI framework type zeolite and *BEA framework type zeolite may consist of less than or equal to 1 wt. %, 0.5 wt. %, 0.3 wt. %, 0.1 wt. %, 0.01, or even 0.001 wt. % of transition metals. As described in this disclosure, transition metals include scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, darmstadtium, roentgenium, and copernicium.

In one embodiment, a relatively large amount of *BEA framework type zeolite may be present in the cracking catalyst. For example, at least 80 wt. % of the total zeolite in the cracking catalyst may be *BEA framework type zeolite. In other embodiments, at least 85 wt. %, at least 90 wt. %, at least 95 wt. %, at least 98 wt. %, at least 99 wt. %, at least 99.5 wt. %, or even at least 99.9 wt. % of the total zeolite in the cracking catalyst may be *BEA framework type zeolite.

In another embodiment, *BEA framework type zeolite and MFI framework type zeolite constitute a large amount or, in some embodiments, almost all of the total zeolite in the cracking catalyst. For example, at least 99 wt. % of the total zeolite in the cracking catalyst may be one or more of *BEA framework type zeolite and MFI framework type zeolite. This means that the amount of all zeolite compounds which are MFI framework type zeolites and all zeolite compounds which are *BEA framework type zeolites constitute at least 99 wt. % of all zeolite compounds present in the cracking catalyst. Additionally, in some embodiments, where at least 99 wt. % of the total zeolite in the cracking catalyst may be one or more of *BEA framework type zeolite and MFI framework type zeolite, at least 80 wt. % of the total zeolite is *BEA framework type zeolite (such as at least 85 wt. %, at least 90 wt. %, or even 95 wt. %).

In one or more embodiments, the catalyst composition may comprise one or more binder materials, such as alumina-containing compounds or silica-containing compounds (including compounds containing alumina and silica). As used in this disclosure, "binder materials" refer to materials which may serve to "glue" or otherwise hold the zeolite and the matrix together in the microsphere. Binder materials may improve the attrition resistance of the catalyst particle. The binder material may comprise alumina (such as amorphous alumina), silica-alumina (such as amorphous silica-alumina), or silica (such as amorphous silica). According to one or more embodiments, the binder material may comprise pseudoboehmite. As used in this disclosure, "pseudoboehmite" refers to an aluminum-containing compound with the chemical composition AlO(OH) consisting of crystalline boehmite. Suitable pseudoboehmite includes CATAPAL® aluminas, commercially available from Sasol Limited of Johannesburg, South Africa. Boehmite refers to aluminum oxide hydroxide as well, but pseudoboehmite generally has a greater amount of water than boehmite. The binder material, such as pseudoboehmite, may be peptized with an acid, such as a mono-protic acid, such as nitric acid ("$HNO_3$") or hydrochloric acid ("HCl").

According to one or more embodiments, the cracking catalyst may comprise the one or more binder materials in an amount of from 5 wt. % to 35 wt. % of the total cracking catalyst. For example, according to embodiments, the cracking catalyst may comprise binder material in an amount of from 5 wt. % to 25 wt. % of the total cracking catalyst, from 5 wt. % to 20 wt. % of the total cracking catalyst, from 5 wt. % to 15 wt. % of the total cracking catalyst, from 5 wt. % to 10 wt. % of the total cracking catalyst, from 10 wt. % to 35 wt. % of the total cracking catalyst, from 15 wt. % to 35 wt. % of the total cracking catalyst, 20 wt. % to 35 wt. % of the total cracking catalyst, or from 25 wt. % to 35 wt. % of the total cracking catalyst. According to additional embodiments, cracking catalyst may comprise the binder materials in an amount of from 10 wt. % to 20 wt. % of the total cracking catalyst, such as from 12 wt. % to 18 wt. % of the total cracking catalyst, or from 14 wt. % to 16 wt. % of the total cracking catalyst. It should be understood that, in one or more embodiments, the cracking catalyst may include any single disclosed binder material in an amount of the disclosed wt. % ranges. In additional embodiments, the cracking catalyst may include any two or more binder materials in combination in an amount of the disclosed wt. % ranges.

In one or more embodiments, the catalyst composition may comprise one or more matrix materials. As use in this disclosure, "matrix materials" may refer to a clay material such as kaolin. Without being bound by theory, it is believed that the matrix materials of the catalyst serves both physical and catalytic functions. Physical functions include providing particle integrity and attrition resistance, acting as a heat transfer medium, and providing a porous structure to allow diffusion of hydrocarbons into and out of the catalyst microspheres. The matrix can also affect catalyst selectivity, product quality and resistance to poisons. The matrix materials may tend to exert its strongest influence on overall catalytic properties for those reactions which directly involve relatively large molecules.

In one or more embodiments, the matrix material comprises kaolin. As used in this disclosure, "kaolin" refers to a clay material that has a relatively large amount (such as at least about 50 wt. %, at least 60 wt. %, at least 70 wt. %, at least 80 wt. %, at least 90 wt. %, or even at least 95 wt. %) of kaolinite, which can be represented by the chemical formula $Al_2Si_2O_5(OH)_4$. Kaolin is sometimes referred to as "china clay." In additional embodiments, the matrix material may comprise other clay materials.

According to one or more embodiments, the cracking catalyst comprises or more matrix materials in an amount of from 25 wt. % to 65 wt. % of the total cracking catalyst. For example, according to embodiments, the cracking catalyst may comprise the matrix material in an amount of from 25 wt. % to 55 wt. % of the total cracking catalyst, from 25 wt. % to 50 wt. % of the total cracking catalyst, from 25 wt. % to 45 wt. % of the total cracking catalyst, from 25 wt. % to 40 wt. % of the total cracking catalyst, from 25 wt. % to 35 wt. % of the total cracking catalyst, from 35 wt. % to 65 wt. % of the total cracking catalyst, from 40 wt. % to 65 wt. % of the total cracking catalyst, from 45 wt. % to 65 wt. % of the total cracking catalyst, from 50 wt. % to 65 wt. % of the total cracking catalyst, or from 55 wt. % to 65 wt. % of the total cracking catalyst. According to additional embodiments, the cracking catalyst may comprise the matrix material in an amount of from 35 wt. % to 55 wt. % of the total cracking catalyst, such as from 40 wt. % to 50 wt. % of the total cracking catalyst, or from 43 wt. % to 47 wt. % of the total cracking catalyst. It should be understood that, in one or more embodiments, the cracking catalyst may include any single disclosed matrix material in an amount of the disclosed wt. % ranges. In additional embodiments, the cracking catalyst may include any two or more matrix materials in combination in an amount of the disclosed wt. % ranges.

As described in this disclosure, the cracking catalyst may be in the form of shaped microparticles, such as microspheres. As described, "microparticles" refer to particles having of size of from 0.1 microns and 100 microns. The size of a microparticle refers to the length of a microparticle in its longest dimension. For example, a spherically shaped microparticle has a size equal to its diameter. A rectangular prism shaped microparticle, such as a cube, has a size of as measured between opposite corners of the rectangular prism. Irregularly shaped microparticles have a size as measured between its two most distance surfaces.

According to embodiments, if more than one zeolite compound is utilized, the various zeolite compounds may all be included in each microparticle. However, in other embodiments, microparticles may be mixed, where the microparticles contain only a portion of the zeolite mixture. For example, a mixture of two microparticle types may be included in the cracking catalyst, where one type of microparticle includes only MFI framework type zeolite and one type of microparticle includes only *BEA framework type zeolite.

The cracking catalyst may be formed by a variety of processes. According to one embodiment, the matrix material may be mixed with a fluid such as water to form a slurry, and the zeolites may be separately mixed with a fluid such as water to form a slurry. The matrix material slurry and the zeolite slurry may be combined under stirring. Separately, another slurry may be formed by combining the binder material with a fluid such as water. The binder slurry may then be combined with the slurry containing the zeolites and matrix material to form an all-ingredients slurry. The all-ingredients slurry may be dried, for example by spraying, and then calcinated, to produce the microparticles of the cracking catalyst.

The cracking catalyst may be deactivated by contact with steam prior to use in a reactor to convert hydrocarbons. The purpose of steam treatment is to accelerate the hydrothermal aging which occurs in an operational FCC regenerator to obtain an equilibrium catalyst. Steam treatment may lead to the removal of aluminum from the framework leading to a decrease in the number of sites where framework hydrolysis can occur under hydrothermal and thermal conditions. This removal of aluminium results in an increased thermal and hydrothermal stability in dealuminated zeolites. The unit cell size may decrease as a result of dealumination since the smaller $SiO_4$ tetrahedron replaces the larger $AlO_4^-$ tetrahedron. The acidity of zeolites may also affected by dealumination through the removal of framework aluminum and the formation of extra-framework aluminum species. Dealumination may affect the acidity of the zeolite by decreasing the total acidity and increasing the acid strength of the zeolite. The total acidity may decrease because of the removal of framework aluminum, which act as Bronsted acid sites. The acid strength of the zeolite may be increased because of the removal of paired acid sites or the removal of the second coordinate next nearest neighbour aluminum. The increase in the acid strength may be caused by the charge density on the proton of the OH group being highest when there is no framework aluminum in the second coordination sphere.

According to one or more embodiments, the hydrocarbon feed stream may be contacted by the cracking catalyst in a reactor unit. As used in this disclosure, a "reactor unit" refers to a vessel or series of vessels in which one or more chemical reactions may occur between one or more reactants in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors.

As depicted in FIG. 1, according to one or more embodiments, the reactor unit used to convert the hydrocarbon feed stream may be a fluidized bed reactor. As used in this disclosure, a "fluid catalytic cracking reactor" refers to a reactor unit that can be operable to contact a fluidized reactant with a solid material (usually in particulate form), such as a cracking catalyst. As described in this disclosure, a fluidized bed reactor which cracks a reactant stream with a fluidized solid cracking catalyst may be referred to as a fluid catalytic cracking reactor unit.

FIG. 1 schematically depicts a fluid catalytic cracking reactor unit 100 which converts a hydrocarbon feed stream 110 into a product stream 120. The embodiment of FIG. 1 includes cracking catalyst regeneration functionality.

Still referring to FIG. 1, the hydrocarbon feed stream 110 may be passed to a fluid catalytic cracking reactor unit 100. The fluid catalytic cracking reactor unit 100 may include a cracking catalyst/feed mixing zone 132, a reaction zone 134, a separation zone 136, and a cracking catalyst regeneration zone 138. The hydrocarbon feed stream 110 may be introduced to the cracking catalyst/feed mixing zone 132 where it is mixed with regenerated cracking catalyst from regenerated catalyst stream 140 passed from the cracking catalyst regeneration zone 138. The hydrocarbon feed stream 110 is reacted by contact with the regenerated cracking catalyst in the reaction zone 134, which cracks the contents of the hydrocarbon feed stream 110. Following the cracking reaction in the reaction zone 134, the contents of the reaction zone 134 are passed to the separation zone 136 where the cracked product of the reaction zone 134 is separated from spent catalyst, which is passed in a spent catalyst stream 142 to the cracking catalyst regeneration zone 138 where it is regenerated by, for example, removing coke from the spent cracking catalyst if coke was created in the reaction. Alternatively, if little or no coke is created, the regeneration process may comprise heating the catalyst by, for example, burning a combustible fuel. The product stream 120 is passed from the fluid catalytic cracking reactor unit, where it may be further processed, for example by separation into multiple streams.

It should be understood that fluid catalytic cracking reactor unit 100 of FIG. 1 is a simplified schematic of one particular embodiment of a fluid catalytic cracking reactor unit, and other configurations of fluid catalytic cracking reactor units may be suitable for the presently disclosed hydrocarbon cracking methods. For example, in some embodiments, the catalyst may not be recycled, and in such embodiments, the components of FIG. 1 related to the regeneration of the cracking catalyst would not be present.

The hydrocarbon feed stream 110 may be a crude oil feedstock, or at least a portion of a crude oil feedstock such as a "cut," or may be processed in some way prior to being cracked. For example a crude oil which is heavier than the hydrocarbon feed stream 110 oil may be separated into two or more components to form the hydrocarbon feed stream 110, where the lighter fraction is the hydrocarbon feed stream 110. In some embodiments, the hydrocarbon feed stream 110 may be processed by hydroprocessing to remove components such as one or more of metals, sulfur, nitrogen, or aromatics prior to being treated with the cracking catalysts presently described. However, the contents of the feed stream may have not been subjected to thermal cracking or other conventional cracking techniques commonly utilized in refining processes. According to various embodiments, at least 50 wt. %, 60 wt. %, 70 wt. %, 80 wt. %, 90 wt. %, 95 wt. %, or even 99 wt. % of the hydrocarbon feed stream may be a light fraction of a crude oil, such as a light fraction of Arab Extra Light Crude.

According to one or more embodiments, the hydrocarbon feed stream 110 which is cracked consists of a light fraction of Arab Extra Light Crude Oil, or a light fraction of an crude oil having similar composition or properties to Arab Extra Light Crude Oil. Arab Extra Light Crude oil typically may have an API gravity of approximately 39.4 degrees, such as from 39 degrees to 40 degrees. Some properties of Arab Extra Light Crude, an example feedstock fuel for the cracking process of the present disclosure, is shown in Table 1.

TABLE 1

Example of Arab Extra Light Feedstock

| Analysis | Units | Value |
| --- | --- | --- |
| American Petroleum Institute (API) gravity | degree | 55.9 |
| Density | grams per cubic centimeter (g/cm³) | 0.755 |
| Sulfur Content | weight percent (wt. %) | 0.04 |
| Nickel | parts per million by weight (ppmw) | less than 1 |
| Vanadium | ppmw | 0 |
| Sodium Chloride (NaCl) Content | ppmw | 0 |
| Conradson Carbon | wt. % | 0 |

In some embodiments, a crude oil feedstock may be separated into a light fraction and a heavy fraction, where the maximum boiling point of any of the contents of the light fraction is a temperature from 200° C. to 400° C. (such that the crude oil was fractionated at a temperature from 200° C. to 400° C.). For example, a crude oil may be fractionated at a temperature of from 200° C. to 250° C., from 250° C. to 300° C., from 300° C. to 350° C., or from 350° C. to 400° C., and the light fraction may be utilized as the feed stream. In such embodiments, the heavy fraction contains contents which boil at temperatures greater than the fractionating temperature, and the light fraction contains contents which boil at temperatures less than the fractionating temperature.

Figure 2:
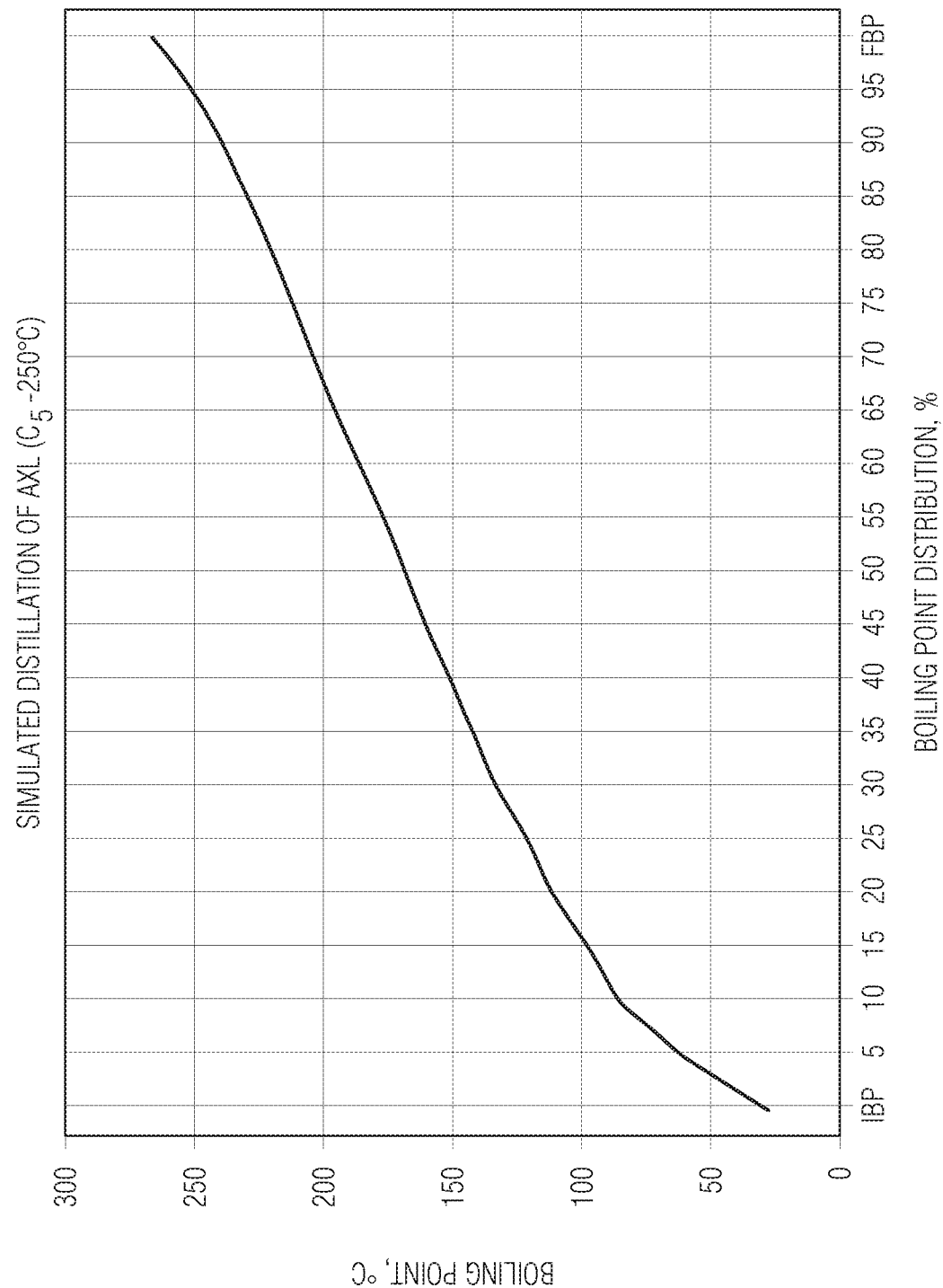
FIG. 2 depicts boiling point data for an example fraction of Arab Extra Light Crude Oil, according to one or more embodiments described in this disclosure.

FIG. 2 depicts the boiling point profile for an example embodiment of a feed stream that is a fraction of Arab Extra Light Crude, where the faction contains from C5 hydrocarbons (low end boiling point) to hydrocarbons boiling at 250° C. (high end boiling point). In FIG. 2, "IBP" refers to the initial boiling point and "FBP" refers to the final boiling point. FIG. 2 depicts weight percentages of oil boiled as a function of increasing temperature. Such a feed stream may be formed by fractionating Arab Extra Light Crude (C5+) at 250° C. It should be understood that hydrocarbons lighter than C5 may still be contained in the feed stream at low concentrations. However, most of the C4 or lighter species may be eliminated from an Arab Extra Light crude stream by other separation means. The API Gravity of the stream of FIG. 2 is 55.9. Example feed streams may have an API Gravity of from 45 degrees to 65 degrees, such as from 50 degrees to 60 degrees.

According to one or more embodiments, the hydrocarbon feed stream 110 may have a boiling point profile as described by the 5 wt. % boiling temperature, the 25 wt. % boiling temperature, the 50 wt. % boiling temperature, the 75 wt. % boiling temperature, and the 95 wt. % boiling temperature. These respective boiling temperatures correspond to the temperature at which a given weight percentage of the hydrocarbon feed stream boils. In some embodiments, the hydrocarbon feed stream 100 may have one or more of a 5 wt. % boiling temperature of less than 100° C., a 25 wt. % boiling temperature of less than 150° C., a 50 wt. % boiling temperature of less than 200° C., a 75 wt. % boiling temperature of less than 250° C., and a 95 wt. % boiling temperature of less than 300° C. According to one or more embodiments, the hydrocarbon feed stream 100 may have one or more of a 5 wt. % boiling temperature of from 25° C. to 100° C., a 25 wt. % boiling temperature of from 100° C. to 200° C., a 50 wt. % boiling temperature of from 150° C. to 200° C., a 75 wt. % boiling temperature of from 175° C. to 250° C., and a 95 wt. % boiling temperature of from 200° C. to 300° C.

According to one or more embodiments, the fluid catalytic cracking reaction may be a high severity fluid catalytic cracking reaction. As used in this disclosure, "high severity" fluid catalytic cracking refers to cracking under reaction temperatures of at least about 500 degrees Celsius ("° C."). According to one or more embodiments, the reaction zone 134 of the fluid catalytic cracking reactor unit 100 may operate at a temperature of from 500° C. to 700° C., such as from about 550° C. to about 650° C., or from about 575° C. to about 625° C.

According to embodiments, the catalyst to oil weight ratio may be from 7 to 10, such as from 7.5 to 9.5 or from 7.75 to 8.25. In one or more embodiments, the residence time of the mixture in the reaction zone 127 may be from 0.2 to 2 seconds.

According to one or more embodiments, the contacting of the hydrocarbon feed stream 110 with the cracking catalyst produces a product stream 120 that may comprise at least 20 wt. % of light olefins selected from ethylene, propylene, and butene. For example, in embodiments, the product stream 120 may comprise, at least 22 wt. % of light olefins, at least 25 wt. % of light olefins, or even at least at least 30 wt. % of light olefins. In additional embodiments, the product stream 120 may comprise at least 2 wt. % of ethylene, at least 3 wt. % of ethylene, at least 5 wt. % of ethylene, or even at least 6 wt. % of ethylene, at least 7 wt. % of propylene, at least 8 wt. % of propylene, at least 12 wt. % of propylene, or even at least 14 wt. % of propylene, at least 6 wt. % of butene, at least 8 wt. % of butene, at least 10 wt. % of butene, or even at least 12 wt. % of butene.

Figure 3:
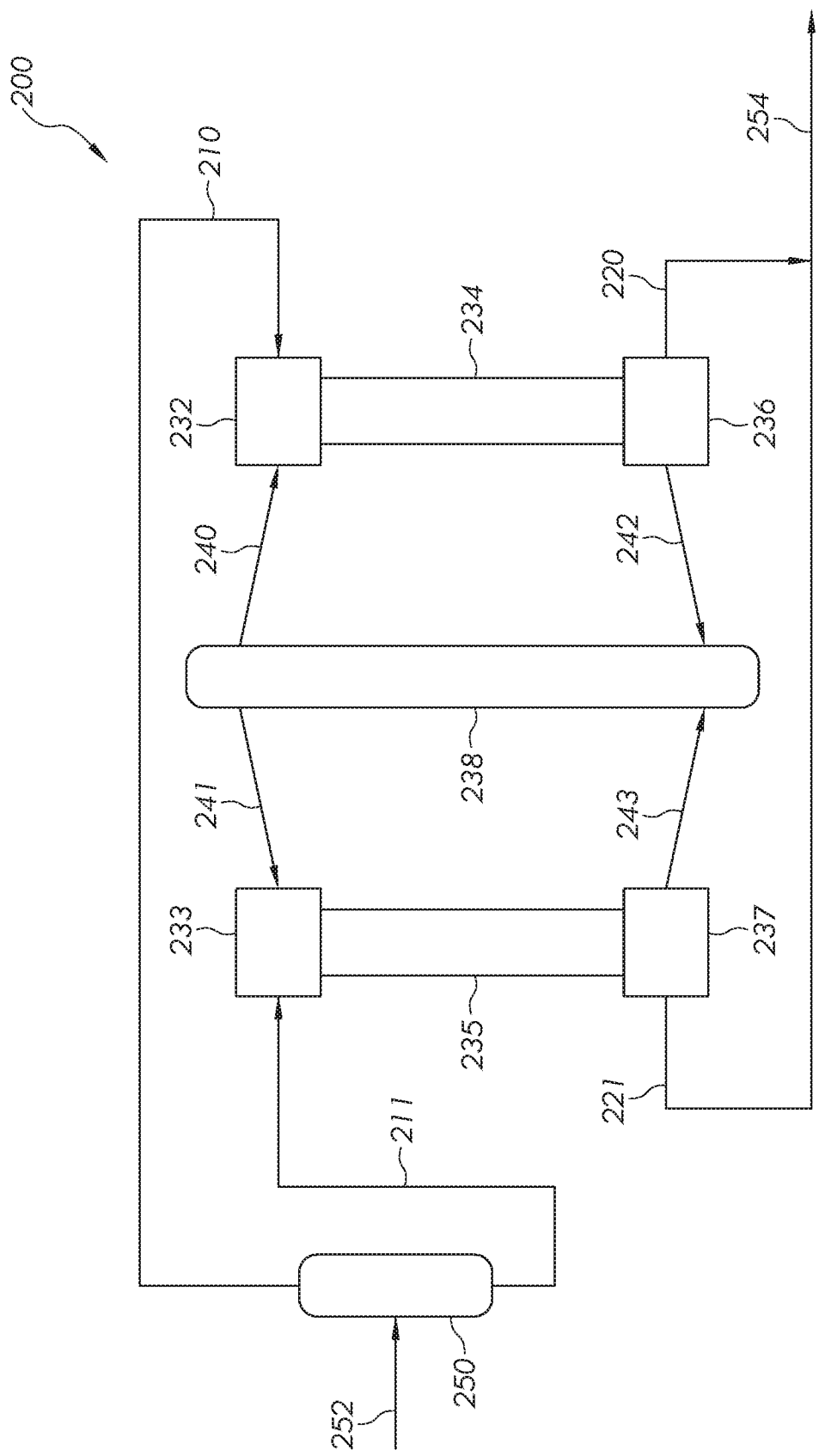
FIG. 3 depicts another generalized schematic diagram of an embodiment of a fluid catalytic cracking reactor unit, according to one or more embodiments described in this disclosure.

Now referring to FIG. 3, in another embodiment, a separation unit 250 is utilized to fractionate a crude feed stream 252 into a light fraction stream 210 and a heavy fraction stream 211. The light fraction stream 210 be cracked in a separate reactor from the heavy fraction 211. However, the same catalyst may be utilized in each reaction and regenerated in a shared regeneration section 238. In FIG. 3, the system of FIG. 1 is integrated with a companion reactor in parallel which handles the heavy cut of the crude inlet stream.

System 200 of FIG. 3 may comprise a cracking catalyst/feed mixing zone 232, a reaction zone 234, a separation zone 236, and a cracking catalyst regeneration zone 238. The light fraction stream 210 may be introduced to the cracking catalyst/feed mixing zone 232 where it is mixed with regenerated cracking catalyst from regenerated catalyst stream 240 passed from the cracking catalyst regeneration zone 238. The light fraction stream 210 is reacted by contact with the regenerated cracking catalyst in the reaction zone 234, which cracks the contents of the light fraction stream 210. Following the cracking reaction in the reaction zone 234, the contents of the reaction zone 234 are passed to the separation zone 236 where the cracked product of the reaction zone 234 is separated from spent catalyst, which is passed in a spent catalyst stream 242 to the cracking catalyst regeneration zone 238 where it is regenerated by, for example, removing coke from the spent cracking catalyst if coke was created. The light product stream 220 is passed from the fluid catalytic cracking reactor unit, where it may be further processed, for example by separation into multiple streams.

System 200 of FIG. 3 may also comprise a cracking catalyst/feed mixing zone 233, a reaction zone 234, a separation zone 237. The heavy fraction stream 211 may be introduced to the cracking catalyst/feed mixing zone 233 where it is mixed with regenerated cracking catalyst from regenerated catalyst stream 241 passed from the cracking catalyst regeneration zone 238. The heavy fraction stream 211 is reacted by contact with the regenerated cracking catalyst in the reaction zone 235, which cracks the contents of the heavy fraction stream 211. Following the cracking reaction in the reaction zone 235, the contents of the reaction zone 235 are passed to the separation zone 237 where the cracked product of the reaction zone 235 is separated from spent catalyst, which is passed in a spent catalyst stream 243 to the cracking catalyst regeneration zone 238 where it is regenerated by, for example, removing coke from the spent cracking catalyst. The heavy product stream 221 is passed from the fluid catalytic cracking reactor unit, where it may be further processed, for example by separation into multiple streams. The light product stream 220 and heavy product stream 221 may be combined to form a combined product stream 254.

In some embodiments, coke may be produced by the cracking of the heavy cut of the crude oil in reaction zone 235, which may be burned in regeneration zone 238 to heat the catalyst utilized in reaction zone 234. Therefore, if no coke is formed for burning in regeneration zone 234, less supplemental energy may be required due to the integration of the heavy cut and light cut cracking.

EXAMPLES

The various embodiments of methods and systems for cracking light hydrocarbon streams will be further clarified by the following examples. The examples are illustrative in nature, and should not be understood to limit the subject matter of the present disclosure.

Example 1—Cracking Catalyst Preparation

A number of cracking catalysts were prepared with varying amounts of ZSM-5, zeolite Y, and zeolite Beta. Additionally, comparative catalysts were prepared under the same procedures. The catalyst compositions prepared are show in Tables 2. Additionally, comparative catalyst compositions were prepared and are shown in Table 3. The ZSM-5 zeolite used was CBV 2314 zeolite commercially available from Zeolyst International, which has a silica to alumina ratio of 23. The zeolite Beta used was CP814E zeolite commercially available from Zeolyst International, which has a silica to alumina ratio of 25. The zeolite Y used was SP13-0159 zeolite commercially available from W.R. Grace and Company, which had a silica to alumina ratio of 6.

TABLE 1

|  | Sample 1 | Sample 2 | Sample 3 | Sample 4 | Sample 5 |
|---|---|---|---|---|---|
| wt. % Kaolin | 45 | 65 | 55 | 45 | 35 |
| wt. % Alumina | 15 | 15 | 15 | 15 | 15 |
| wt. % ZSM-5 | 0 | 10 | 10 | 10 | 10 |
| wt. % zeolite Beta | 40 | 10 | 20 | 30 | 40 |
| wt. % zeolite Y | 0 | 0 | 0 | 0 | 0 |

TABLE 2

|  | Comparative Sample A | Comparative Sample B | Comparative Sample C |
|---|---|---|---|
| wt. % Kaolin | 45 | 45 | 45 |
| wt. % Alumina | 15 | 15 | 15 |
| wt. % ZSM-5 | 10 | 0 | 40 |
| wt. % zeolite Beta | 10 | 0 | 0 |
| wt. % zeolite Y | 20 | 40 | 0 |

To prepare the catalysts, first, ZSM-5 (supplied by Zeolyst International, loss on ignition 8 wt. %, silica/alumina=23), zeolite Y, and zeolite Beta (supplied by Zeolyst International, loss on ignition 16 wt. %, Silica/alumina=25) were impregnated with phosphorus. The targeted phosphorus content was 3.5 wt. % $P_2O_5$ of the total cracking catalyst weight.

To prepare the catalysts, first, ZSM-5, zeolite Y, and zeolite Beta were impregnated with phosphorus. The targeted phosphorus content was 3.5 wt. % $P_2O_5$ of the total cracking catalyst weight.

The catalysts were prepared by blending kaolin clay powder (supplied by SASOL, having loss on ignition 14.8 wt %) with de-ionized water. In a separate step, the zeolite mixture (dry basis) was made into a slurry with de-ionized water. While stirring the zeolite slurry, an appropriate amount of ortho-phosphoric acid (concentration 85 wt %) was gradually added to achieve 3.5 wt. % of total zeolite weight. Stirring was continued for another 15 minutes. The zeolite-phosphoric acid slurry was then added to the kaolin slurry and stirred for 5 minutes. Separately, a slurry of Catapal A alumina (supplied by SASOL, having loss on ignition of 28 wt %) was prepared by mixing Catapal alumina (dry basis) with distilled water, which was peptized by adding an appropriate amount of concentrated nitric acid (concentration of 70 wt. %) and stirring for thirty minutes. The resulting peptized Catapal slurry was added to the zeolite-kaolin slurry and blended for 10 minutes, producing a slurry with high viscosity where the individual particles remain suspended.

The resulting slurry was made up of 30 wt. % solids was spray dried to produce particles of 20-100 microns. The dried particles were then calcined at 500° C. for 3 hours.

Example 2—Catalytic Testing

Catalytic cracking of a light cut of Arab Extra Light Crude Oil (composition shown in Table 1) was carried out in a fixed-bed microactivity testing unit ("MAT") unit, manufactured by Sakuragi Rikagaku of Japan according to ASTM D-3907 and D-5154 testing protocols. For each MAT run, a full mass balance was obtained and was found to be around 100%. All MAT runs were performed at a cracking temperature of 600° C. and a time-on-stream of 30 seconds. All samples were steamed at 810° C. for 6 hours prior to experimentation.

Data related the catalytic activity of the catalyst formulations of Tables 2 and 3 are provided in Tables 4 and 5, respectively. For the purpose of assessing the catalyst performance on conversion of light fractions (that is, those with hydrocarbons of 5 or less carbon molecules), is defined as the total weight percent of gas products and coke for the cracking of Arab Extra Light Crude fractions. Conversion of light fractions (dry gasses and LPG) is represented by "CONV. (wt. %)" in Tables 4 and 5.

TABLE 4

|  | Sample 1 | Sample 2 | Sample 3 | Sample 4 | Sample 5 |
|---|---|---|---|---|---|
| catalyst to oil ratio by weight | 2.99 | 2.87 | 2.99 | 2.83 | 2.99 |
| CONV. (wt %) | 37.09 | 16.67 | 21.47 | 23.41 | 30.93 |
| Yields (wt %) |  |  |  |  |  |
| ethylene | 2.6 | 2.28 | 2.53 | 2.24 | 2.87 |
| propylene | 11.4 | 5.35 | 7.34 | 8.04 | 10.67 |
| butene | 10.4 | 5.25 | 6.87 | 7.76 | 9.53 |
| Groups (wt %) |  |  |  |  |  |
| $H_2$—$C_2$ (dry gas) | 6.15 | 4.71 | 5.01 | 4.37 | 5.65 |
| $C_3$—$C_4$ (LPG) | 30.72 | 11.88 | 16.43 | 19.01 | 25.14 |
| $C_2=$ -$C_4=$ (Light olefins) | 24.39 | 12.87 | 16.74 | 18.03 | 23.06 |
| Gasoline | 51.8 | 67.08 | 66.27 | 66.31 | 60.88 |

TABLE 5

|  | Comparative Sample A | Comparative Sample B | Comparative Sample C |
|---|---|---|---|
| catalyst to oil ratio by weight | 3 | 3 | 3 |
| CONV.(wt %) | 13.67 | 14.68 | 20.8 |
| Yields | | | |
| ethylene | 1.35 | 1.37 | 3.19 |
| propylene | 4 | 4.45 | 7.3 |
| butene | 4.8 | 5.2 | 5.1 |
| Groups (wt %) | | | |
| $H_2$—$C_2$ (dry gas) | 2.8 | 2.79 | 5.55 |
| $C_3$—$C_4$ (LPG) | 10.72 | 11.74 | 14.19 |
| $C_2=$ -$C_4=$ (light olefins) | 10.15 | 11.01 | 15.59 |
| Gasoline | 75.82 | 71.47 | 67.33 |
| Coke | 3 | 3 | 3 |

The results show the effect of zeolite Beta loading on conversion and product distribution. Conversion and light olefin yield increased as the zeolite beta loading in each catalyst formulation increased. The highest conversion and the highest light olefin yield are obtained when zeolite Beta is the only active component in the catalyst formulation. Without being bound by theory, this may suggest that the acid sites in zeolite beta are capable of activating the light hydrocarbon molecules which are thermodynamically more difficult to crack than the heavy molecules. Due to the nature of its pore size and acid sites, zeolite Beta produces more propylene and butenes than ethylene, due to low hydrogen transfer reactions.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

According to a first aspect of the present disclosure, a method for cracking a hydrocarbon feed stream comprises contacting the hydrocarbon feed stream with a cracking catalyst in a reactor unit, where the hydrocarbon feed stream has an API gravity of at least 40 degrees, and where the cracking catalyst comprises: one or more binder materials in an amount of from 5 wt. % to 35 wt. % of the total cracking catalyst; one or more matrix materials in an amount of from 25 wt. % to 65 wt. % of the total cracking catalyst; and *BRA framework type zeolite in an amount of from 5 wt. % to 45 wt. % of the total cracking catalyst, where at least 80 wt. % of the total zeolite in the cracking catalyst is *BEA framework type zeolite.

A second aspect of the present disclosure may include the first aspect, where the hydrocarbon feed stream has an API gravity of from 45 degrees to 65 degrees.

A third aspect of the present disclosure may includes the first or second aspects, where the hydrocarbon feed stream is a fraction of a crude oil feedstock.

A fourth aspect of the present disclosure may include any of the first through third aspects, where the reactor unit is a fluidized bed reactor.

A fifth aspect of the present disclosure may include any of the first through fourth aspects, where the amount of the *BEA framework type zeolite is from 30 wt. % to 45 wt. % of the total cracking catalyst.

A sixth aspect of the present disclosure may include any of the first through fifth aspects, where the amount of the total zeolite in the cracking catalyst is from 10 wt. % to 50 wt. % of the cracking catalyst.

A seventh aspect of the present disclosure may include any of the first through sixth aspects, where at least 99 wt. % of the total zeolite in the cracking catalyst is *BEA framework type zeolite.

An eighth aspect of the present disclosure may include the seventh aspect, where the *BEA framework type zeolite comprises phosphorous pentoxide.

A ninth aspect of the present disclosure may include any of the first through eighth aspects, where the *BEA framework type zeolite comprises from 1 wt. % to 20 wt. % of phosphorous pentoxide.

A tenth aspect of the present disclosure may include any of the first through ninth aspects, where at least one of the one or more binder materials is pseudoboehmite.

An eleventh aspect of the present disclosure may include any of the first through tenth aspects, where the cracking catalyst comprises from 5 wt. % to 35 wt. % of pseudoboehmite.

A twelfth aspect of the present disclosure may include any of the first through eleventh aspects, where the amount of the one or more binder materials is from 10 wt. % to 20 wt. % of the total cracking catalyst.

A thirteenth aspect of the present disclosure may include any of the first through twelfth aspects, where one or more of the matrix materials is kaolin.

A fourteenth aspect of the present disclosure may include any of the first through thirteenth aspects, where cracking catalyst comprises the one or more binder materials in an amount of from 30 wt. % to 50 wt. % of the total cracking catalyst.

A fifteenth aspect of the present disclosure may include any of the first through fourteenth aspects, where the catalyst to oil weight ratio is from 7 to 10.

A sixteenth aspect of the present disclosure may include any of the first through the fifteenth aspects, where the contacting of the hydrocarbon feed stream with the cracking catalyst produces a product stream comprising at least 20 wt. % of light olefins selected from ethylene, propylene, and butene.

A seventeenth aspect of the present disclosure may include any of the first through the sixteenth aspects, further comprising fractionating a crude oil at a fractionating temperature of from 200° C. to 400° C. to form the hydrocarbon feed stream.

An eighteenth aspect of the present disclosure may include any of the first through the seventeenth aspects, where the *BEA framework type zeolite comprises zeolite Beta.

According to a nineteenth aspect of the present disclosure, a method for cracking a hydrocarbon feed stream comprises contacting the hydrocarbon feed stream with a cracking catalyst in a reactor unit, where the hydrocarbon feed stream has an API gravity of at least 40 degrees, and where the cracking catalyst comprises: one or more binder materials in an amount of from 5 wt. % to 35 wt. % of the total cracking catalyst; one or more matrix materials in an amount of from 25 wt. % to 65 wt. % of the total cracking catalyst; *BEA framework type zeolite in an amount of from 5 wt. % to 45 wt. % of the total cracking catalyst; and MFI framework type zeolite in an amount of from 5 wt. % to 45 wt. % of the total cracking catalyst.

A twentieth aspect of the present disclosure may include the nineteenth aspect, where at least 99 wt. % of the total zeolite in the cracking catalyst is *BEA framework type zeolite, MFI framework type zeolite, or a combination of *BEA framework type zeolite and MFI framework type zeolite.

A twenty-first aspect of the present disclosure may include the nineteenth or twentieth aspects, where the hydrocarbon feed stream is a light fraction of a crude oil feedstock.

A twenty-second aspect of the present disclosure may include any of the nineteenth through the twenty-first aspects, where the reactor unit is a fluidized bed reactor.

A twenty-third aspect of the present disclosure may include any of the nineteenth through twenty-second aspects, where the amount of the *BEA framework type zeolite is from 10 wt. % to 20 wt. % of the total cracking catalyst.

A twenty-fourth aspect of the present disclosure may include any of the nineteenth through twenty-third aspects, where the amount of the MFI framework type zeolite is from 10 wt. % to 20 wt. % of the total cracking catalyst.

A twenty-fifth aspect of the present disclosure may include any of the nineteenth through twenty-fourth aspects, where the amount of the total zeolite in the cracking catalyst is from 10 wt. % to 50 wt. % of the cracking catalyst.

A twenty-sixth aspect of the present disclosure may include any of the nineteenth through twenty-fifth aspects, where one or more of the MFI framework type zeolite and *BEA framework type zeolite comprise phosphorous pentoxide.

A twenty-seventh aspect of the present disclosure may include any of the nineteenth through twenty-sixth aspects, where one or more of the MFI framework type zeolite and *BEA framework type zeolite comprise from 1 wt. % to 20 wt. % of phosphorous pentoxide.

A twenty-eighth aspect of the present disclosure may include any of the nineteenth through twenty-seventh aspects, where at least one of the one or more binder materials is pseudoboehmite.

A twenty-ninth aspect of the present disclosure may include any of the nineteenth through twenty-eighth aspects, where the cracking catalyst comprises from 5 wt. % to 35 wt. % of pseudoboehmite.

A thirtieth aspect of the present disclosure may include any of the nineteenth through twenty-ninth aspects, where the amount of the one or more binder materials is from 10 wt. % to 20 wt. % of the total cracking catalyst.

A thirty-first aspect of the present disclosure may include any of the nineteenth through thirtieth aspects, where one or more of the matrix materials is kaolin.

A thirty-second aspect of the present disclosure may include any of the nineteenth through thirty-first aspects, where cracking catalyst comprises the one or more binder materials in an amount of from 30 wt. % to 50 wt. % of the total cracking catalyst.

A thirty-third aspect of the present disclosure may include any of the nineteenth through thirty-second aspects, where the catalyst to oil weight ratio is from 7 to 10.

A thirty-fourth aspect of the present disclosure may include any of the nineteenth through thirty-third aspects, where the contacting of the light hydrocarbon stream with the cracking catalyst produces a product stream comprising at least 20 wt. % of light olefins selected from ethylene, propylene, and butene.

A thirty-fifth aspect of the present disclosure may include any of the nineteenth through thirty-fourth aspects, where the MFI framework type zeolite comprises ZSM-5.

A thirty-sixth aspect of the present disclosure may include any of the nineteenth through thirty-fifth aspects, where the *BEA framework type zeolite comprises zeolite Beta.

A thirty-seventh aspect of the present disclosure may include any of the nineteenth through thirty-sixth aspects, further comprising fractionating a crude oil at a fractionating temperature of from 200° C. to 400° C. to form the hydrocarbon feed stream.

According to a thirty-eighth aspect of the present disclosure, a system for cracking a hydrocarbon feed stream comprises a reactor; a hydrocarbon feed stream entering the reactor, where the hydrocarbon feed stream has an API gravity of at least 40 degrees; a product stream exiting the reactor; and a cracking catalyst positioned at least in the reactor, where the cracking catalyst comprises: one or more binder materials in an amount of from 5 wt. % to 35 wt. % of the total cracking catalyst; one or more matrix materials in an amount of from 25 wt. % to 65 wt. % of the total cracking catalyst; and *BEA framework type zeolite in an amount of from 5 wt. % to 45 wt. % of the total cracking catalyst, where at least 80 wt. % of the total zeolite in the cracking catalyst is *BEA framework type zeolite.

A thirty-ninth aspect of the present disclosure may include the thirty-eighth aspect, where the hydrocarbon feed stream has an API gravity of from 45 degrees to 65 degrees.

A fortieth aspect of the present disclosure may include the thirty-eighth aspect or the thirty-ninth aspect, where the hydrocarbon feed stream is a fraction of a crude oil feedstock.

A forty-first aspect of the present disclosure may include any of the thirty eighth through fortieth aspects, where the reactor unit is a fluidized bed reactor.

A forty-second aspect of the present disclosure may include any of the thirty eighth through forty-first aspects, where the amount of the *BEA framework type zeolite is from 30 wt. % to 45 wt. % of the total cracking catalyst.

A forty-third aspect of the present disclosure may include any of the thirty eighth through forty-second aspects, where the amount of the total zeolite in the cracking catalyst is from 10 wt. % to 50 wt. % of the cracking catalyst.

A forty-fourth aspect of the present disclosure may include any of the thirty eighth through forty-third aspects, where at least 99 wt. % of the total zeolite in the cracking catalyst is *BEA framework type zeolite.

A forty-fifth aspect of the present disclosure may include any of the thirty eighth through forty-fourth aspects, where the *BEA framework type zeolite comprises phosphorous pentoxide.

A forty-sixth aspect of the present disclosure may include any of the thirty eighth through forty-fifth aspects, where at least one of the one or more binder materials is pseudoboehmite.

A forty-seventh aspect of the present disclosure may include any of the thirty eighth through forty-sixth aspects, where the cracking catalyst comprises from 5 wt. % to 35 wt. % of pseudoboehmite.

A forty-eighth aspect of the present disclosure may include any of the thirty eighth through forty-seventh aspects, where the amount of the one or more binder materials is from 10 wt. % to 20 wt. % of the total cracking catalyst.

A forty-ninth aspect of the present disclosure may include any of the thirty eighth through forty-eighth aspects, where one or more of the matrix materials is kaolin.

A fiftieth aspect of the present disclosure may include any of the thirty eighth through forty-ninth aspects, where cracking catalyst comprises the one or more binder materials in an amount of from 30 wt. % to 50 wt. % of the total cracking catalyst.

A fifty-first aspect of the present disclosure may include any of the thirty eighth through fiftieth aspects, where the *BEA framework type zeolite comprises zeolite Beta.

According to a fifty-second aspect of the present disclosure, a system for cracking a hydrocarbon feed stream comprises a reactor; a hydrocarbon feed stream entering the reactor, where the hydrocarbon feed stream has an API gravity of at least 40 degrees; a product stream exiting the reactor; and a cracking catalyst positioned at least in the reactor, where the cracking catalyst comprises: one or more binder materials in an amount of from 5 wt. % to 35 wt. % of the total cracking catalyst; one or more matrix materials in an amount of from 25 wt. % to 65 wt. % of the total cracking catalyst; *BEA framework type zeolite in an amount of from 5 wt. % to 45 wt. % of the total cracking catalyst; and MFI framework type zeolite in an amount of from 5 wt. % to 45 wt. % of the total cracking catalyst.

A fifty-third aspect of the present disclosure may include the fifty-second aspect, where at least 99 wt. % of the total zeolite in the cracking catalyst is *BEA framework type zeolite, MFI framework type zeolite, or a combination of *BEA framework type zeolite and MFI framework type zeolite.

A fifty-fourth aspect of the present disclosure may include the fifty second aspect or fifty-third aspect, where the hydrocarbon feed stream is a light fraction of a crude oil feedstock.

A fifty-fifth aspect of the present disclosure may include any of the fifty-second through fifty-fourth aspects, where the reactor unit is a fluidized bed reactor.

A fifty-sixth aspect of the present disclosure may include any of the fifty-second through fifty-fifth aspects, where the amount of the *BEA framework type zeolite is from 10 wt. % to 20 wt. % of the total cracking catalyst.

A fifty-seventh aspect of the present disclosure may include any of the fifty-second through fifty-sixth aspects, where the amount of the MFI framework type zeolite is from 10 wt. % to 20 wt. % of the total cracking catalyst.

A fifty-eighth aspect of the present disclosure may include any of the fifty-second through fifty-seventh aspects, where the amount of the total zeolite in the cracking catalyst is from 10 wt. % to 50 wt. % of the cracking catalyst.

A fifty-ninth aspect of the present disclosure may include any of the fifty-second through fifty-eighth aspects, where one or more of the MFI framework type zeolite and *BEA framework type zeolite comprise phosphorous pentoxide.

A sixtieth aspect of the present disclosure may include any of the fifty-second through fifty-ninth aspects, where at least one of the one or more binder materials is pseudoboehmite.

A sixty-first aspect of the present disclosure may include any of the fifty-second through sixtieth aspects, where the amount of the one or more binder materials is from 10 wt. % to 20 wt. % of the total cracking catalyst.

A sixty-second aspect of the present disclosure may include any of the fifty-second through sixty-first aspects, where one or more of the matrix materials is kaolin.

A sixty-third aspect of the present disclosure may include any of the fifty-second through sixty-second aspects, where cracking catalyst comprises the one or more binder materials in an amount of from 30 wt. % to 50 wt. % of the total cracking catalyst.

A sixty-fourth aspect of the present disclosure may include any of the fifty-second through sixty-third aspects, where the MFI framework type zeolite comprises ZSM-5.

A sixty-fifth aspect of the present disclosure may include any of the fifty-second through sixty-fourth aspects, where the *BEA framework type zeolite comprises zeolite Beta.

What is claimed is:

1. A method for cracking a hydrocarbon feed stream, the method comprising:
    contacting the hydrocarbon feed stream with a cracking catalyst in a reactor unit, where the hydrocarbon feed stream has an API gravity of from 45 degrees to 65 degrees, and where the cracking catalyst comprises:
    one or more binder materials in an amount of from 5 wt. % to 35 wt. % of the cracking catalyst;
    one or more matrix materials in an amount of from 25 wt. % to 65 wt. % of the cracking catalyst; and
    *BEA framework zeolite in an amount of from 5 wt. % to 45 wt. % of the cracking catalyst, where at least 90 wt. % of the total combined weight of zeolites in the cracking catalyst is *BEA framework zeolite,
    where the *BEA framework zeolite comprises less than 1 wt. % of transition metal.

2. The method of claim 1, where the amount of the *BEA framework zeolite is from 30 wt. % to 45 wt. % of the cracking catalyst.

3. The method of claim 1, where the amount of the total combined weight of zeolites in the cracking catalyst is from 10 wt. % to 50 wt. % of the cracking catalyst.

4. The method of claim 1, where at least 99 wt. % of the total combined weight of zeolites in the cracking catalyst is *BEA framework zeolite.

5. The method of claim 1, where one or more of the matrix materials is kaolin.

6. The method of claim 1, where a catalyst to oil weight ratio is from 7 to 10.

7. The method of claim 1, where the contacting of the hydrocarbon feed stream with the cracking catalyst produces a product stream comprising at least 20 wt. % of light olefins selected from ethylene, propylene, and butene.

8. The method of claim 1, further comprising fractionating a crude oil at a fractionating temperature of from 200° C. to 400° C. to form the hydrocarbon feed stream.

9. The method of claim 1, where the *BEA framework zeolite comprises zeolite Beta.

10. The method of claim 1, where the hydrocarbon feed stream has a 5 wt. % boiling temperature of from 25° C. to 100° C., a 25 wt. % boiling temperature of from 100° C. to 200° C., a 50 wt. % boiling temperature of from 150° C. to 200° C., a 75 wt. % boiling temperature of from 175° C. to 250° C., and a 95 wt. % boiling temperature of from 200° C. to 300° C.

11. The method of claim 1, where the *BEA framework zeolite comprises less than or equal to 0.1 wt. % of transition metal.

12. A method for cracking a hydrocarbon feed stream, the method comprising:
    contacting the hydrocarbon feed stream with a cracking catalyst in a reactor unit, where the hydrocarbon feed stream has an API gravity of at least 40 degrees, and where the cracking catalyst comprises:
    one or more binder materials in an amount of from 5 wt. % to 35 wt. % of the cracking catalyst;
    one or more matrix materials in an amount of from 25 wt. % to 65 wt. % of the cracking catalyst;
    *BEA framework zeolite in an amount of from 5 wt. % to 45 wt. % of the cracking catalyst; and
    MFI framework zeolite in an amount of from 5 wt. % to 45 wt. % of the cracking catalyst,
    where at least 98 wt. % of the total combined weight of zeolites in the cracking catalyst is *BEA framework zeolite, MFI framework zeolite, or a combination of *BEA framework zeolite and MFI framework zeolite; and
    where the *BEA framework zeolite comprises less than 0.5 wt. % of transition metal.

13. The method of claim 12, where at least 99 wt. % of the total combined weight of zeolites in the cracking catalyst is *BEA framework zeolite, MFI framework zeolite, or a combination of *BEA framework zeolite and MFI framework zeolite.

14. The method of claim 12, where the hydrocarbon feed stream is a light fraction of a crude oil feedstock.

15. The method of claim 12, where a catalyst to oil weight ratio is from 7 to 10.

16. The method of claim 12, where the contacting of the light hydrocarbon stream with the cracking catalyst produces a product stream comprising at least 20 wt. % of light olefins selected from ethylene, propylene, and butene.

17. The method of claim 12, where the MFI framework zeolite comprises ZSM-5 and the *BEA framework zeolite comprises zeolite Beta.

18. The method of claim 12, further comprising fractionating a crude oil at a fractionating temperature of from 200° C. to 400° C. to form the hydrocarbon feed stream.

19. The method of claim 12, where the hydrocarbon feed stream has a 5 wt. % boiling temperature of from 25° C. to 100° C., a 25 wt. % boiling temperature of from 100° C. to 200° C., a 50 wt. % boiling temperature of from 150° C. to 200° C., a 75 wt. % boiling temperature of from 175° C. to 250° C., and a 95 wt. % boiling temperature of from 200° C. to 300° C.

20. The method of claim 12, where the MFI framework zeolite comprises less than 1 wt. % of transition metal.

21. The method of claim 12, where the *BEA framework zeolite comprises less than or equal to 0.1 wt. % of transition metal.

* * * * *

UNITED STATES PATENT AND TRADEMARK OFFICE
CERTIFICATE OF CORRECTION

PATENT NO. : 10,526,546 B2  
APPLICATION NO. : 15/897966  
DATED : January 7, 2020  
INVENTOR(S) : Aaron Chi Akah and Anas Saleh Aqeeli Page 1 of 1

It is certified that error appears in the above-identified patent and that said Letters Patent is hereby corrected as shown below:

On the Title Page

Page 2, item (56), other publications, cite no. 1, delete:
"" Energy industry conversion"
(https://www.platts.com/IM.Platts.Content/MethodologyReferences/ConversionTables/Images/CCSS1015_Energy_IIndustry_Conversions_LRG.pdf) (date:2017)."

And insert:
--"Energy industry conversion"
(https://www.platts.com/IM.Platts.Content/MethodologyReferences/ConversionTables/Images/CCSS1015_Energy_Industry_Conversions_LRG.pdf) (date:2017).--, therefor.

Signed and Sealed this  
Twenty-sixth Day of May, 2020

Andrei Iancu  
*Director of the United States Patent and Trademark Office*